United States Patent
Ketchel et al.

(10) Patent No.: US 11,204,089 B2
(45) Date of Patent: Dec. 21, 2021

(54) METHOD OF JOINING A PINION CARTRIDGE AND AN AXLE HOUSING

(71) Applicant: Magna Powertrain of America, Inc., Troy, MI (US)

(72) Inventors: Brad Ketchel, Oxford, MI (US); Wade Smith, Mussey, MI (US); Ryan Strand, Rochester Hills, MI (US); Ryan Shaw, Southfield, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 213 days.

(21) Appl. No.: 16/243,628

(22) Filed: Jan. 9, 2019

(65) Prior Publication Data

US 2019/0226572 A1    Jul. 25, 2019

Related U.S. Application Data

(60) Provisional application No. 62/619,157, filed on Jan. 19, 2018.

(51) Int. Cl.
| | |
|---|---|
| *F16H 57/023* | (2012.01) |
| *F16H 57/037* | (2012.01) |
| *B23P 11/02* | (2006.01) |
| *F16H 48/42* | (2012.01) |
| *F16H 48/38* | (2012.01) |

(52) U.S. Cl.
CPC .......... *F16H 57/023* (2013.01); *B23P 11/025* (2013.01); *F16H 48/42* (2013.01); *F16H 57/037* (2013.01); *B23P 2700/50* (2013.01); *F16H 2048/382* (2013.01); *F16H 2048/423* (2013.01)

(58) Field of Classification Search
CPC ...... F16H 57/023; F16H 48/42; F16H 57/037; F16H 2048/382; F16H 2048/423; B23P 11/025; B23P 2700/50
See application file for complete search history.

(56) References Cited

U.S. PATENT DOCUMENTS

| | | | | |
|---|---|---|---|---|
| 3,170,534 | A * | 2/1965 | Kelley | B60K 17/165 180/308 |
| 5,520,589 | A * | 5/1996 | Dewald | F16H 48/08 475/160 |
| 10,871,218 | B2 * | 12/2020 | Schwark | F16H 48/08 |
| 2018/0253516 | A1 * | 9/2018 | Shimano | G06F 30/20 |
| 2020/0084382 | A1 * | 3/2020 | Furukawa | G03B 5/04 |
| 2020/0238519 | A1 * | 7/2020 | Diankov | B25J 9/1664 |
| 2020/0298404 | A1 * | 9/2020 | Theobald | B25J 9/041 |

* cited by examiner

*Primary Examiner* — Rick K Chang

(74) *Attorney, Agent, or Firm* — Dickinson Wright PLLC

(57) ABSTRACT

A method for joining components of a vehicle drive axle assembly. The method includes heating an axle housing to a first predetermined temperature and cooling a pinion cartridge to be installed with the housing to a second predetermined temperature. Removing the axle housing from exposure to the first predetermined temperature and removing the pinion cartridge from the second predetermined temperature and rapidly installing the pinion cartridge within the axle assembly before the axle assembly and the pinion return to ambient temperature provides a frictional fit, joining the two components without use of additional fastening devices.

23 Claims, 4 Drawing Sheets

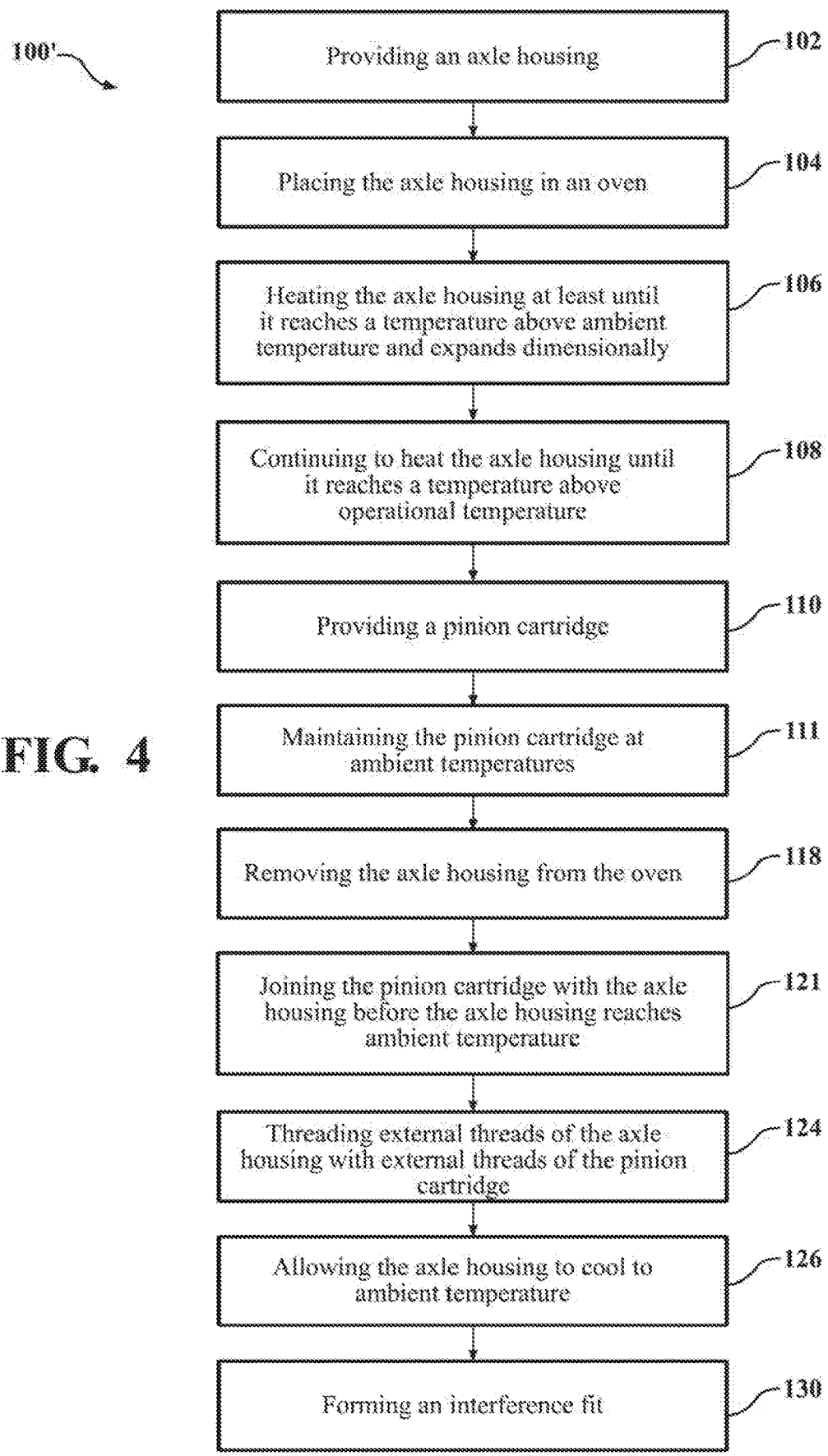

METHOD OF JOINING A PINION CARTRIDGE AND AN AXLE HOUSING

CROSS-REFERENCE TO RELATED APPLICATIONS

This application claims the benefit of and priority to U.S. Provisional Patent Application Ser. No. 62/619,157 filed on Jan. 19, 2018, the entire disclosure of which is hereby incorporated by reference.

FIELD

The present disclosure relates generally to a method of joining components of a drive axle assembly. More specifically, the present disclosure is directed to a method of joining a pinion cartridge and an axle housing of a drive axle assembly utilizing a thermal interference fit.

BACKGROUND

This section provides background information related to the present disclosure which is not necessarily prior art.

With the increased use of magnesium (and other metals and/or alloys) in drive axle assemblies of two-wheel drive (2WD), four-wheel drive (4WD) and all-wheel drive (AWD) motor vehicles, there is a need to adjust the tolerance between a pinion cartridge and an axle housing. In most drive axle assemblies, the pinion cartridge and the axle housing of a drive axle assembly should have a slight interference (i.e., frictional), fit to maintain structural support across expected operational temperature ranges. This arrangement allows for the pinion cartridge and the axle housing to provide complimentary support to each other within the drive axle assembly and eliminates the need to use another fastening device(s) to secure the pinion cartridge to the axle housing at a predetermined location.

A challenge with using a frictional fit to secure the pinion cartridge to the axle housing is that the pinion cartridge and the axle housing may be constructed of dissimilar metals. These metals may have unique thermal expansion properties. For example, the thermal expansion of a magnesium axle housing is higher than that of an aluminum pinion cartridge. As a result, precise dimensioning of the pinion cartridge and the axle assembly to ensure a frictional fit at ambient temperature may result in difficulties during the assembly process. Additionally, dimensional changes as a result of the operational temperature ranges of the vehicle need to be accommodated.

In most joining methods of a pinion cartridge and an axle assembly, a fastening device such as a stake, bolt, or thread lock adhesive is used to prevent the pinion cartridge from rotating within the axle assembly (and thereby moving from its intended position, discussed in more detail below). In order to assemble the pinion cartridge within the axle housing at ambient temperature, the dimensioning of these components must allow for rotation (i.e., for assembly). As a result, after assembly, the pinion cartridge must be secured to the axle housing using a fastening device to prevent unwanted rotation. The fastening device increases the overall mass of the combined assembly and increases the assembly time and cost.

While such conventional methods of joining a pinion cartridge and an axle assembly are adequate for their intended purpose, a need still exists to advance the technology and methods for joining these products to provide an enhanced method that provides improved strength, reduced weight, ease of assembly, and reduction of cost.

SUMMARY

This section provides a general summary of the disclosure and should not be interpreted as a complete and comprehensive listing of all of the objects, aspects, features and advantages associated with the present disclosure.

It is an object of the present disclosure to provide method of joining a pinion cartridge and an axle housing in a drive axle assembly for a motor vehicle having a powertrain, the method including placing the axle housing in an oven having an oven temperature set above ambient, allowing the axle housing in the oven to reach the set oven temperature above ambient, placing the pinion cartridge in a cooling chamber having a cooling chamber temperature set below ambient, allowing the pinion cartridge in the cooling chamber to reach the set cooling chamber temperature below ambient, removing the axle housing from the oven and the pinion cartridge from the cooling chamber, and joining the pinion cartridge from the cooling chamber with the axle housing from the oven by threading the pinion cartridge into the axle housing.

It is a further object of the present disclosure to provide a method of joining a pinion cartridge and an axle housing for a motor vehicle having a powertrain, the method including placing the axle housing in an oven having an oven temperature set above ambient, allowing the axle housing in the oven to reach the set oven temperature above ambient, removing the axle housing from the oven, and joining the pinion cartridge at ambient temperature with the axle housing from the oven by threading the pinion cartridge into the axle housing.

It is yet another further object of the present disclosure to provide a method of joining a pinion cartridge and an axle housing for a motor vehicle having a powertrain, the method including placing the axle housing in an oven having an oven temperature set above the operating temperature of the axle housing, allowing the axle housing in the oven to reach the set oven temperature above the operating temperature of the axle housing, removing the axle housing from the oven, and joining the pinion cartridge at ambient temperature with the axle housing from the oven by threading the pinion cartridge into the axle housing.

Further areas of applicability will become apparent from the detailed description provided herein. The specific embodiments and examples set forth in this summary are intended for purposes of illustration only and are not intended to limit the scope of the present disclosure.

DRAWINGS

The drawings described herein are only provided to illustrate selected non-limiting embodiments and are not intended to limit the scope of the present disclosure. According to the following:

FIG. 4 is a flow chart illustrating a second method for joining a pinion cartridge and an axle housing.

DETAILED DESCRIPTION

Figure 1:
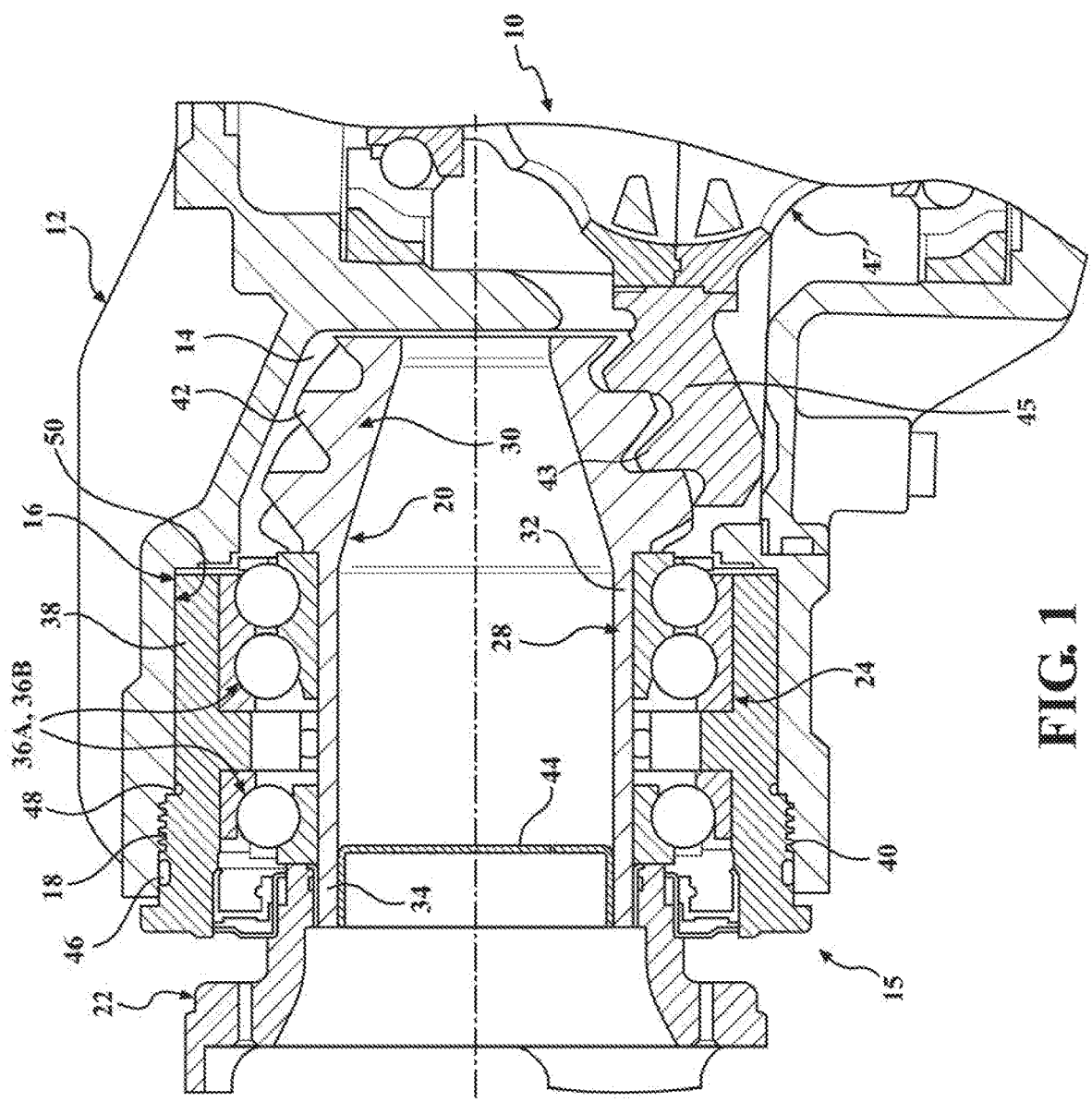
FIG. 1 is a sectional view of an embodiment of a pinion cartridge joined to an axle housing of a drive assembly in accordance with the teachings of the present disclosure.

Example embodiments will now be described more fully with reference to the accompanying drawings. The example embodiments are provided so that this disclosure will be thorough, and will fully convey the scope of the present disclosure to those who are skilled in the art. In particular, various examples of methods of joining different pinion cartridges and axle assemblies for drive axle assemblies of motor vehicles will be described to which products and/or assemblies embodying the teachings of the present disclosure are well-suited for use. To this end, various pinion cartridges and axle assemblies are disclosed which can be joined using a method of temperature differential and/or frictional fit between the pinion cartridges and the axle assemblies in accordance with the teachings of the present disclosure. However, numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

Referring initially to FIG. 1, an example of a drive axle assembly 10 for a motor vehicle is shown to generally include an axle housing 12 and a pinion cartridge 15. Axle housing 12 includes a pinion cartridge cavity 14 for receiving a pinion/bearing/coupling arrangement, hereinafter referred to as pinion cartridge 15. Axle housing 12 includes an axle housing engagement surface 16 and external threads 18 for selectively engaging pinion cartridge 15. It should be understood that axle housing 12 may be constructed of other materials (including but not limited to alloys and composites) and that the use of magnesium herein is merely exemplary and not limiting.

Pinion cartridge 15 is shown to generally include a pinion unit 20, a coupler unit 22, an aluminum bearing unit 24, and a pinion cartridge engagement surface 50. Pinion unit 20 is configured as a hollow steel component (preferably forged) having a tubular pinion shaft segment 28 and a tubular pinion gear segment 30. While pinion shaft segment 28 and pinion gear segment 30 is shown to be integrally formed as a homogenous steel component, it will be understood that pinion gear segment 30 can alternatively be a separate hollow component (e.g., made of a similar or different material), that is rigidly secured to a first end of pinion shaft segment 28. Pinion shaft segment 28 has a first end portion 32 from which pinion gear segment 30 extends and a second end portion 34. Bearing unit 24 includes a pair of laterally-spaced bearing assemblies 36A, 36B that are operably installed between pinion shaft segment 28 and a bearing housing portion 38 configured to be installed in axle housing 12. The bearing housing portion can be dimensionally larger than the axle housing at ambient temperature and/or operating temperature. Bearing housing portion 38 functions to axially position bearing assemblies 36A, 36B. It should be understood that pinion cartridge 15 and its components as described herein may be constructed of other materials (including but not limited to alloys and composites) and that the use of steel and aluminum herein is merely exemplary and not limiting.

Bearing housing portion 38 includes external threads 40 provided to permit the axial positioning of pinion cartridge 15 to be adjusted relative to axle housing 12 of drive axle assembly 10 for setting the desired preload and/or backlash between gear teeth 42 on pinion gear segment 30 and gear teeth 42 on a ring gear 45 associated with differential assembly 47. A grease cap 44 is shown installed within second end portion 34 of pinion shaft segment 28. Seal rings 46, 48 are provided on bearing housing portion 38 of pinion cartridge 15 and axle housing 12.

Figure 2:
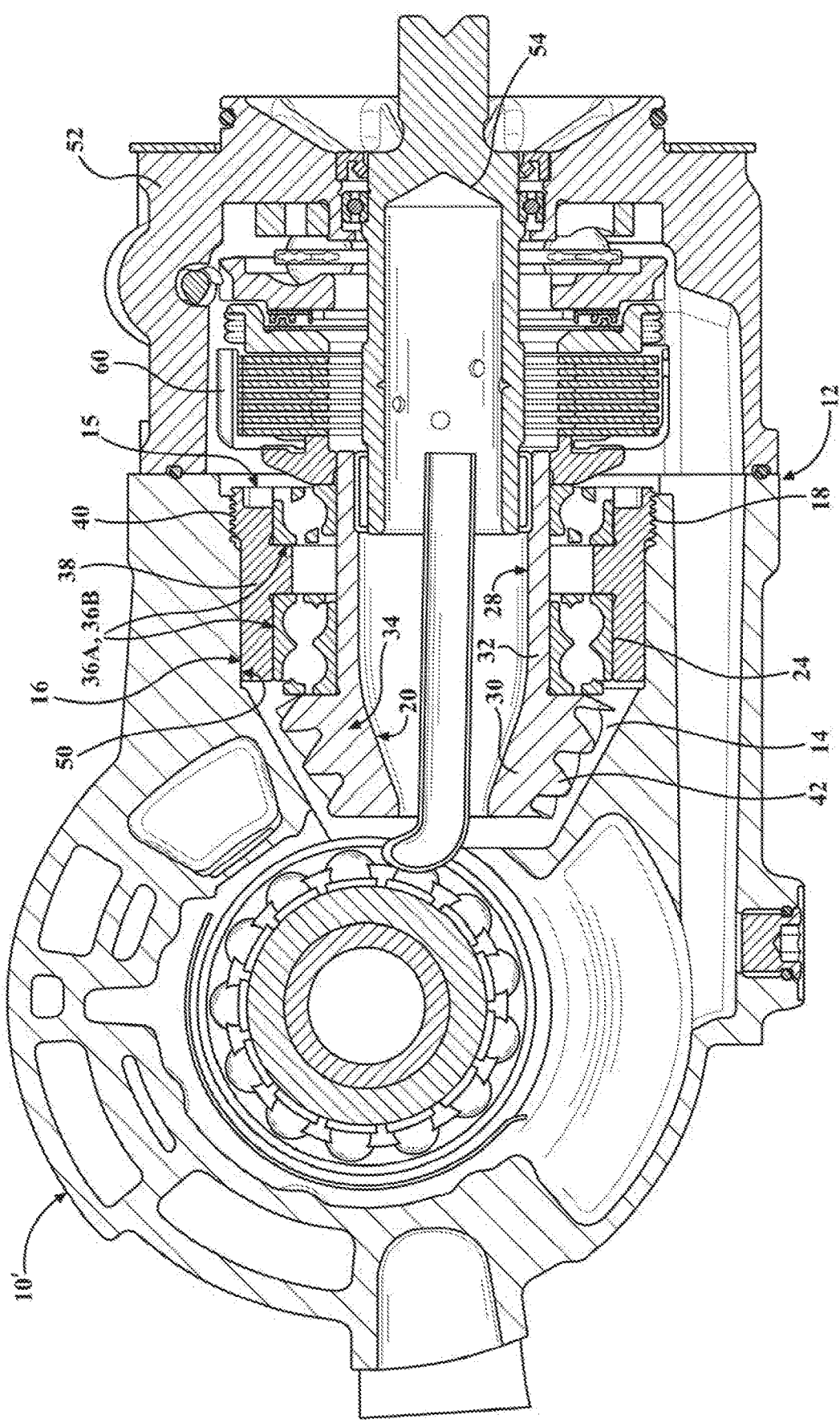
FIG. 2 is a sectional view of another embodiment of a pinion cartridge joined to an axle housing of a drive assembly in accordance with the teachings of the present disclosure.

Referring now to FIG. 2, an alternative version of a drive axle assembly 10' is shown and is configured for use, for example, in an all-wheel drive (AWD) transfer system. Drive axle assembly 10' includes an axle housing 12 defining a pinion cartridge cavity 14, an axle housing engagement surface 16, and external threads 18. Drive axle assembly 10' is generally similar to the configuration previously described with respect to FIG. 1. Pinion cartridge cavity 14 is configured to receive a pinion/bearing/coupling arrangement, hereinafter referred to as a pinion cartridge 15. Axle housing engagement surface 16 and external threads 18 are configured to selectively engage pinion cartridge 15.

Pinion cartridge 15 is shown to generally include a pinion unit 20, and an aluminum bearing unit 24. Pinion unit 20 is configured as a hollow steel component (preferably forged) having a tubular pinion shaft segment 28 and a tubular pinion gear segment 30. While pinion shaft segment 28 and pinion gear segment 30 is shown to be integrally formed as a homogenous steel component, it will be understood that pinion gear segment 30 can alternatively be a separate hollow component (e.g., made of a similar or different material), that is rigidly secured to a first end of pinion shaft segment 28. Pinion shaft segment 28 has a first end portion 32 from which pinion gear segment 30 extends and a second end portion 34. Bearing unit 24 includes a pair of laterally-spaced bearing assemblies 36A, 36B that are operably installed between pinion shaft segment 28 and a bearing housing portion 38 configured to be installed in axle housing 12. Bearing housing portion 38 functions to axially position bearing assemblies 36A, 36B.

Bearing housing 38 includes external threads 40 provided to permit the axial positioning of pinion cartridge 15 to be adjusted relative to axle housing 12 for setting desired the preload and/or backlash between gear teeth 42 on pinion gear segment 30 and gear teeth on a ring gear (not shown).

Clutch unit 60 is configured to be rigidly secured to axle housing 12 and to support torque transfer coupling 52. Clutch unit 60 is shown as a multi-plate friction clutch having a first clutch member or hub secured to or integrally formed on a tubular shaft segment or input shaft 54.

The arrangements shown in FIGS. 1 and 2 utilize a method for joining axle housing 12 to pinion cartridge 15. For example, the use of magnesium in the manufacture of axle housing 12 has resulted in the need to adjust the tolerances and assembly of axle housing 12 and pinion cartridge 15. Preferably, axle housing 12 and pinion cartridge 15 have a slight interference fit for proper structural support across all operational temperature ranges. However, if axle housing 12 is manufactured from magnesium and pinion cartridge 15 is manufactured from aluminum for example, the thermal expansion properties of both metals impact the desired slight interference fit for proper structural support across all operational temperature ranges. As is known, the thermal expansion of magnesium is higher than that of aluminum. Consequently, a thermal interference fit using the present method joins axle housing 12 and pinion cartridge 15 and provides proper structural support at high operational temperatures. The thermal interference fit can be achieved with precise machining of axle housing 12 and pinion cartridge 15 for the desired interference fit combined with a thermal temperature differential between the two components, as described below. It should be understood that different materials may be substituted for magnesium and aluminum and the above is merely exemplary in nature.

Figure 3:
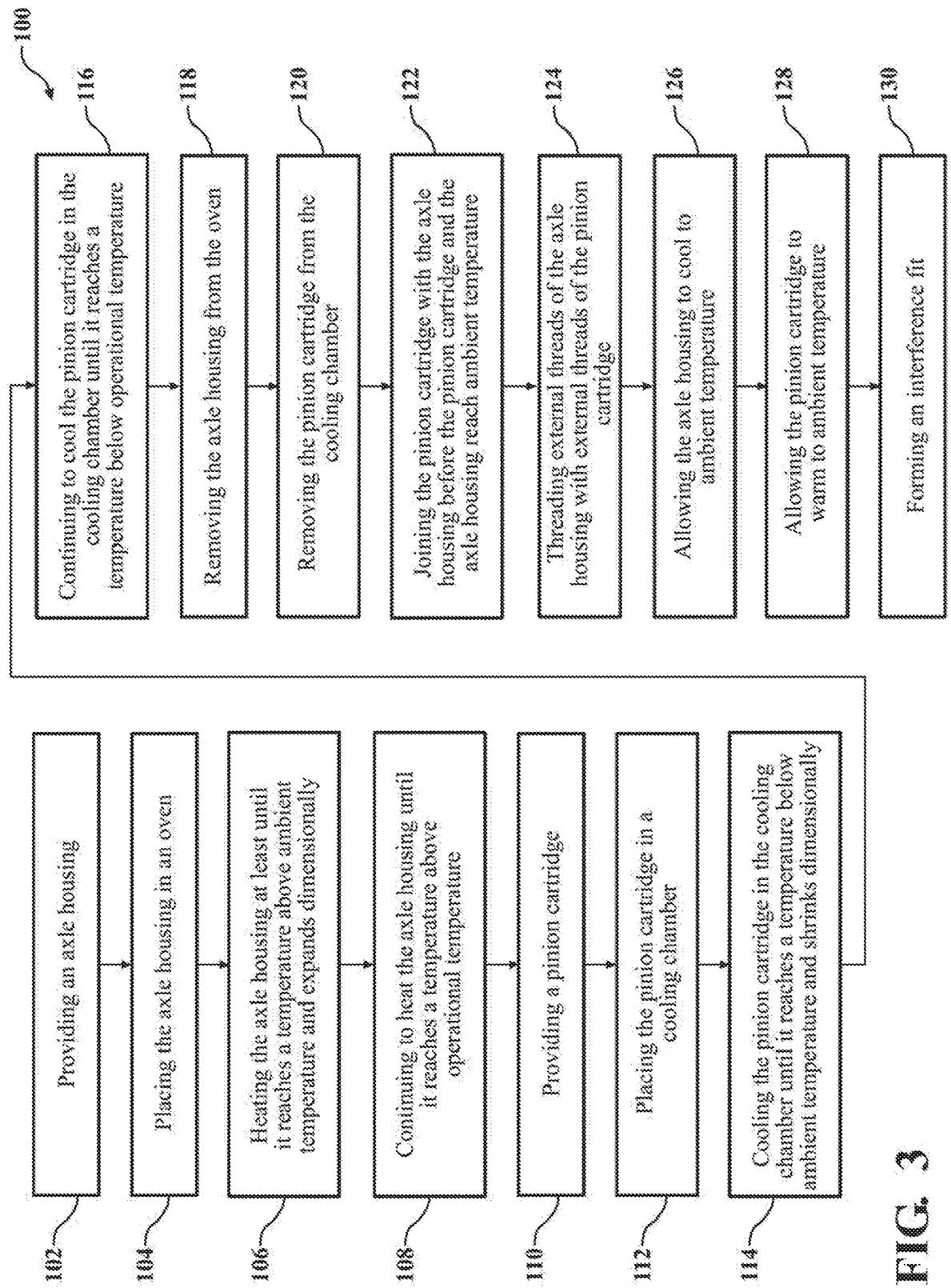
FIG. 3 is a flow chart illustrating a first method for joining a pinion cartridge and an axle housing.

One method 100 in accordance with the present disclosure is illustrated in FIG. 3 and includes the step 102 of providing an axle housing 12 and the step 104 of placing it in an oven. Next, axle housing 12 is heated at step 106 in the oven 70, raising the temperature of axle housing 12 to an oven temperature set above ambient in order to cause axle housing 12 to expand dimensionally. The heating of axle housing 12 may include a step 108 of continuing to heat axle housing 12 until it exceeds the high operational temperatures as described above, for example. Simultaneously, or approximately thereof, pinion cartridge 15 is provided at step 110 and at step 112 is placed in a cooling chamber 72. At step 114, pinion cartridge is cooled, thereby lowering the temperature of pinion cartridge 15 to a set cooling chamber temperature in order to cause pinion cartridge 15 to shrink dimensionally. The cooling of pinion cartridge 15 may include the step 116 of continuing to cool pinion cartridge 15 until it exceeds the expected low operational temperatures, for example. Steps 118, 120 include removing both axle housing 12 and pinion cartridge 15 from the oven and cooling chamber, respectively. Therefore, pinion cartridge 15 is quickly (before axle housing 12 cools and pinion cartridge 15 warms) joined with axle housing 12, as indicated by step 122. The joining of axle housing 12 and pinion cartridge 15 includes the step 124 of threading external threads 18 of axle housing 12 with external threads 40 of pinion cartridge 15 and/or axle housing engagement surface 16 and pinion cartridge engagement surface 50. It should be understood that an interference fit occurs between external threads 18, 40 and/or axle housing engagement surface 16 and pinion cartridge engagement surface 50. As axle housing 12 cools (step 126) and pinion cartridge 15 warms (step 128), an interference (i.e., frictional) fit develops (step 130) between axle housing 12 and pinion cartridge 15. The joining of pinion cartridge 15 with axle housing 12 includes placement for setting (and maintaining via the thermal inference fit) the desired preload and/or backlash as well as insuring proper structural support for all operational temperature ranges as described above. Utilization of this method 100 eliminates the need for a mechanical fastening device to set and maintain the desired preload and/or backlash. Additionally, the mechanical fastening device does not interfere with the proper structural support as a result of operational temperature changes. Further, using this method eliminates additional components (the mechanical device(s)), simplifying assembly and reducing manufacturing costs, while also reducing the weight of drive axle assembly 10.

Another joining method 100' is illustrated in FIG. 4 and involves the step 106 of heating axle housing 12 in the oven for raising the temperature of axle housing 12 to a set temperature above ambient in order to cause axle housing 12 to expand dimensionally. The heating of axle housing 12 may include the step 108 of continuing to heat axle housing 12 until it exceeds the high operational temperatures. Meanwhile, pinion cartridge 15 is kept at ambient temperature (step 111). Upon removing axle housing 12 from the oven (step 118), pinion cartridge 15 is quickly (before axle housing 12 cools) joined (step 121) with axle housing 12. The joining of axle housing 12 and pinion cartridge 15 includes the step 124 of threading using external threads 18 and external threads 40 and/or axle housing engagement surface 16 and pinion cartridge engagement surface 50. As axle housing 12 cools (step 126), a frictional fit (step 130) develops between axle housing 12 and pinion cartridge 15. Depending on the dimensioning and materials of axle housing 12 and pinion cartridge 15, as well as the expected operational temperature ranges, only heating axle housing 12 to a set temperature while maintaining pinion cartridge 15 at ambient temperature may be sufficient for setting (and maintaining) the desired preload and/or backlash as well as insuring proper structural support for all operational temperature ranges. Using this method eliminates the need for a mechanical fastening device to set and maintain the desired preload and/or backlash. Additionally, the mechanical fastening device does not interfere with the proper structural support as a result of operational temperature changes. Further, using this method eliminates additional components (i.e., the mechanical device), simplifying assembly and reducing manufacturing costs, while also reducing the weight of drive axle assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of joining a pinion cartridge and an axle housing for a motor vehicle having a powertrain, the method comprising:
   placing the axle housing in an oven, the oven set to an oven temperature above an ambient temperature of a surrounding environment of the oven;
   allowing the axle housing in the oven to reach the set oven temperature above the ambient temperature of the surrounding environment of the oven;
   placing the pinion cartridge in a cooling chamber, the cooling chamber set to a cooling chamber temperature below an ambient temperature of a surrounding environment of the cooling chamber;
   allowing the pinion cartridge in the cooling chamber to reach the set cooling chamber temperature below the ambient temperature of the surrounding environment of the cooling chamber;
   removing the axle housing from the oven and the pinion cartridge from the cooling chamber; and
   joining the pinion cartridge at a temperature below the ambient temperature of the surrounding environment of the cooling chamber with the axle housing at a temperature above the ambient temperature of the surrounding environment of the oven by threading the pinion cartridge into the axle housing.

2. The method according to claim 1, wherein the pinion cartridge is defined by a pinion gear and a bearing assembly.

3. The method according to claim 2, wherein the pinion gear is further defined by a pinion shaft segment and a pinion gear segment.

4. The method according to claim 3, wherein the pinion shaft segment and the pinion gear segment is defined as integrally and homogenously formed.

5. The method according to claim 4, wherein the pinion shaft segment and the pinion gear segment is defined as hollow, integrally and homogenously formed by forging.

6. The method according to claim 3, wherein the pinion shaft segment and the pinion gear segment is defined as separately formed from a first material and a second material, the pinion shaft segment having a first end portion to receive the pinion gear segment and a second end portion having an end surface.

7. The method according to claim 6, wherein the pinion shaft segment formed from the first material and the pinon gear segment formed from the second material are rigidly secured to each other at the first end portion of the pinion shaft segment.

8. The method according to claim 2, wherein the bearing assembly is defined by a pair of laterally-spaced bearing assemblies that are operably installed between an intermediate portion of the pinion shaft segment and a bearing assembly housing.

9. The method according to claim 8, wherein the pair of laterally-spaced bearing assemblies are axially positioned by the bearing assembly housing.

10. The method according to claim 8, wherein the bearing assembly housing is defined by external threads to engage internal threads of the axle assembly.

11. The method according to claim 10, wherein the external threads control the positioning of the pinion cartridge relative to a desired preload and/or backlash.

12. The method according to claim 1, wherein the pinion cartridge and the axle assembly are defined as formed from at least one of magnesium, aluminum, steel, and/or alloys thereof.

13. The method according to claim 1, further comprising, after the joining, allowing the axle housing to cool and the pinion cartridge to warm and forming an interference fit therebetween.

14. A method of joining a first component and a second component for a motor vehicle having a powertrain, the method comprising:
   placing the first component in an oven, the oven set to an upper temperature that is greater than an intermediate temperature;
   allowing the first component in the oven to warm toward the set upper temperature;
   placing the second component in a cooling chamber, the cooling chamber set to a lower temperature that is below the intermediate temperature;
   allowing the second component in the cooling chamber to cool toward the set lower temperature;
   removing the first component from the oven and the second component from the cooling chamber; and
   after removing the first and second components, joining the first component with the second component by inserting the second component into the first component.

15. The method according to claim 14, wherein the first component is an axle housing and the second component is a pinion cartridge.

16. The method according to claim 14, wherein the step of joining the first and second components includes threading the second component into the first component.

17. The method according to claim 14, further comprising allowing the first component to cool and allowing the second component to warm and, in response thereto, forming an interference fit.

18. The method according to claim 14, wherein the intermediate temperature is an ambient temperature of a surrounding environment.

19. The method according to claim 14, wherein the first component warms to the set upper temperature prior to removal from the oven and the second component cools to the set lower temperature prior to removal from the cooling chamber.

20. A method of joining a pinion cartridge and an axle housing for a motor vehicle having a powertrain, the method comprising:

placing the axle housing in an oven, the oven set to an upper oven temperature that is greater than an ambient temperature;

allowing the axle housing in the oven to warm toward the upper oven temperature;

placing the pinion cartridge in a cooling chamber, the cooling chamber set to a lower cooling chamber temperature that is less than the ambient temperature;

allowing the pinion cartridge in the cooling chamber to cool toward the lower cooling chamber temperature;

after allowing the axle housing and the pinion cartridge to warm and cool, respectively, removing the axle housing from the oven and the pinion cartridge from the cooling chamber; and after removing the axle housing and the pinion cartridge, joining the pinion cartridge to the axle housing by threading the pinion cartridge into the axle housing.

21. The method according to claim 20 further comprising allowing the pinion cartridge to warm to the ambient temperature and allowing the axle cartridge to cool to the ambient temperature after joining the pinion cartridge to the axle housing.

22. The method according to claim 21 further comprising forming an interference fit after allowing the pinion cartridge to warm and the axle housing to cool.

23. The method according to claim 20, wherein the axle housing and the pinion cartridge are joined prior to the pinion cartridge and axle housing reaching the ambient temperature.

* * * * *